US010042537B2

(12) United States Patent
Flint et al.

(10) Patent No.: US 10,042,537 B2
(45) Date of Patent: Aug. 7, 2018

(54) VIDEO FRAME LOUPE

(71) Applicant: Apple Inc., Cupertino, CA (US)

(72) Inventors: Gary Flint, San Jose, CA (US); Stefan Hafeneger, San Francisco, CA (US); Craig H. Yeh, Austin, TX (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 14/499,816

(22) Filed: Sep. 29, 2014

(65) Prior Publication Data

US 2015/0346984 A1    Dec. 3, 2015

Related U.S. Application Data

(60) Provisional application No. 62/005,282, filed on May 30, 2014.

(51) Int. Cl.
| G06F 3/0484 | (2013.01) |
| G11B 27/10 | (2006.01) |
| G06F 3/0485 | (2013.01) |
| G11B 27/34 | (2006.01) |

(52) U.S. Cl.
CPC ........ *G06F 3/04847* (2013.01); *G06F 3/0485* (2013.01); *G06F 3/04842* (2013.01); *G11B 27/102* (2013.01); *G11B 27/105* (2013.01); *G11B 27/34* (2013.01)

(58) Field of Classification Search
CPC .................................................. G06F 3/04847
See application file for complete search history.

(56) References Cited

U.S. PATENT DOCUMENTS 5,442,744 A    8/1995 Piech et al.

| 2002/0109728 A1* | 8/2002 | Tiongson ............ G06F 3/04855 715/786 |
| 2006/0288392 A1* | 12/2006 | Fleming ................. H04N 5/765 725/94 |
| 2008/0140722 A1* | 6/2008 | Jakobovits ............ G06F 19/321 |
| 2012/0070129 A1* | 3/2012 | Lin ................ H04N 21/234327 386/278 |
| 2014/0270708 A1* | 9/2014 | Girgensohn ............. H04N 9/79 386/282 |

FOREIGN PATENT DOCUMENTS

| EP | 1806920 A1 | 7/2007 |
| EP | 1950956 A2 | 7/2008 |

OTHER PUBLICATIONS

"International Application Serial No. PCT/US2015/033140, International Search Report dated Oct. 22, 2015", 3 pgs.
"International Application Serial No. PCT/US2015/033140, Written Opinion dated Oct. 22, 2015", 5 pgs.

* cited by examiner

*Primary Examiner* — Jennifer N To
*Assistant Examiner* — Ashley M Fortino
(74) *Attorney, Agent, or Firm* — Invoke

(57) ABSTRACT

Video frame loupes are presented that provide a frame-by-frame video navigation tool. A video frame loupe is a graphical user interface (UI) element that may be displayed over a portion of a display screen, and which may be used by a user to navigate frames of a video clip. For example, a user may provider a user input to activate the video frame loupe to be displayed as a preview window that presents a continuum of frames available at the time corresponding to a point at which the video frame loupe UI was invoked. The user may then navigate forward/backward with frame-level accuracy.

20 Claims, 6 Drawing Sheets

VIDEO FRAME LOUPE

CROSS REFERENCE TO RELATED APPLICATIONS

This application claims priority to U.S. Provisional Patent Application No. 62/005,282 entitled VIDEO FRAME LOUPE filed May 30, 2014 which is incorporated herein by reference in its entirety.

BACKGROUND

Media devices, such as cellular telephones, computers, and video playback devices capable of playing back video clips, may utilize media players for playing media recordings such as video clips. Examples of such media players include QuickTime Player, Photo Booth, iPhoto, Aperture, iTunes, and Quick Look, all of which are sold by Apple, Inc. Media players are often configured to provide a window having two main sections, a video frame in which video content is displayed, and a scrub bar which illustrates the progress of the current playback point from a start of the video clip to an end of the video clip using a playhead.

The scrub bar represents a timeline of the video clip being played back. A play/pause button is also provided adjacent the scrub bar (or can be omitted in favor of an alternative method of starting video playback, such as clicking the video frame). For example, while many media player elements may be controlled by a mouse cursor, others may allow for control via touch-screen interfaces, gesture interpreters, hand-held controllers, or the like. The scrub bar usually has an elongate line representing a time period from the start of the video clip to the end of the video clip, over which is provided a progress marker denoting the position along that line of the current playback position. One end of the scrub bar represents the beginning of the video clip and the other end of the scrub bar represents the end of the video clip. The playhead is provided as a progress marker to illustrate the current playback point along the timeline and the degree of progress through the duration of the video clip currently being played back. The playhead may be selected and moved forwards and backwards along the scrub bar. When the playhead is released, the media begins playing at that point of the media recording.

When the mouse cursor hovers over the scrub bar, the media player often displays a pop-up window to present a preview frame representing the portion of the video clip corresponding to the current cursor position. The preview frame of the video clip can generally be displayed as the cursor is positioned over any point on the scrub bar. Manual searching for a specific location in a video clip is performed by "scrubbing" (e.g., by clicking and dragging to move a mouse cursor along the timeline associated with the video), and repositioning the cursor.

BRIEF DESCRIPTION OF THE DRAWINGS

Some embodiments are illustrated by way of example and not limitation in the figures of the accompanying drawings in which.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

According to various embodiments, video frame loupes are presented in a heads-up display (HUD) that presents a video navigation tool. A video frame loupe is a graphical user interface (UI) element that may be displayed over a portion of a display screen, and which may be used by a user to navigate frames of a video clip. For example, a user may provider a user input to activate the video frame loupe to be displayed as a preview window that presents a continuum of frames available at the time corresponding to a point at which the video frame loupe UI was invoked. The user may then navigate forward/backward with frame-level accuracy.

The functionalities of video frame loupes discussed herein may be provided by video frame loupe software modules within an application or an operating system executing on a computer system. A user may interact with the computer system using an input device operationally connected to the computer system. A computer system according to an embodiment of the invention shall be discussed in greater detail below with reference to FIG. 6.

Figure 1:
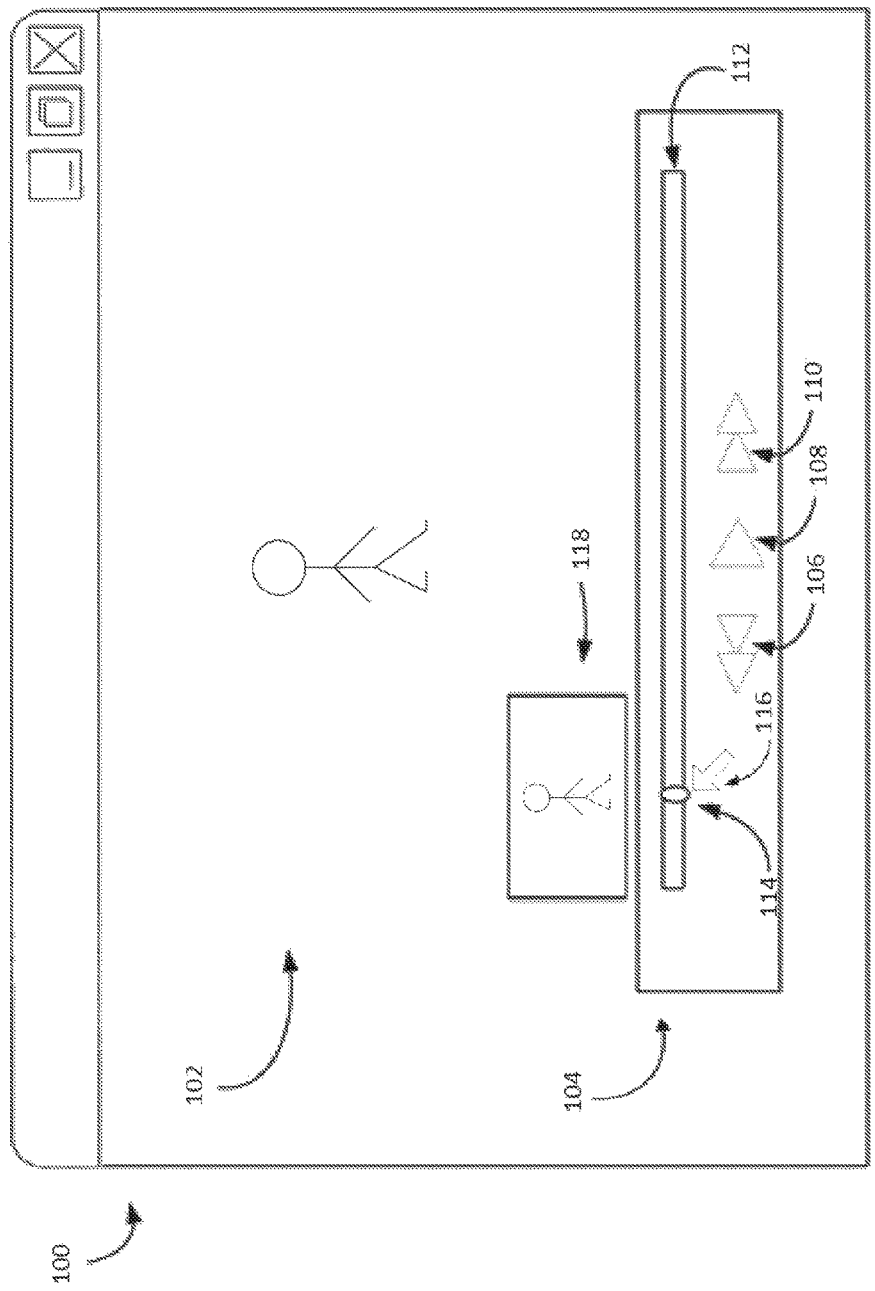
FIG. 1 depicts an illustration of a display screen showing an example video playback user interface of a media player application.

Referring now to the drawings in more detail, FIG. 1 depicts an example illustration of a display screen showing an example video playback user interface of a media player application. The video playback user interface includes a display environment 100. For example, the display environment 100 may be an application window displayed on a display of a computing device. The display environment may be configured to display an image 102. For example, the image 102 may be a video image having successive frames in video files or a still image such as a digital photograph. Control element 104, which may be displayed as superimposed either temporarily or permanently over the currently displayed image 102, includes user interface elements 106, 108 and 110 for controlling the display of video. For example, element 106 allows a user to rewind (move the video back in time) a video clip, element 108 allows a user to play a video clip, and element 110 allows a user to fast forward a video clip. Control element 104 may also include timeline 112, which may also be referred to as a scrub bar, which displays a time scale of the video clip being played and provides an indication of video playback progress.

The timeline 112 indicates to a user the duration of a video clip, how much of the video clip has been played, or how much of the video clip remains to be played. Timeline 112 includes a playhead 114 (sometimes referred to as a position indicator), which shows the time of a current video frame and is movable across the timeline, and that indicates to a user the current position in the timeline during playback of the video clip. The timeline 112 and playhead 114 are selectable, using an associated mouse for example, to also allow a user of the video playback user interface to interact with the timeline 112 to move around the video clip by dragging the playhead 114 to a different position on the timeline 112.

In one example, the media player application receives data from the user via a user input device, such as a keyboard, mouse, touch pad, remote control device, and/or other suitable input devices, including a smart phone or digital tablet configured to communicate with the computing device. Thus, the user input device can be used by the user as a navigation device to traverse from one location of the video clip to another location of the video clip. Such navigation can be performed by changing the position of the playhead 114 on the timeline associated with the video clip, the position of the playhead 114 being communicated to the media player application as navigation information. Cursor 116 is an indicator used to show a position on the display of the computing device that responds to position and other input from the user input device. As shown, when the user desires to navigate to a particular location in a video being displayed, cursor 116 is positioned proximate to the playhead 114. The cursor 116 is then activated, for example, by holding a button on a controller, mouse, or other suitable user input device, and dragged or "scrubbed" to move the playhead 114 to a desired location on the timeline 112. During such a navigation process, a preview window 118 displays a representative video frame that is used to provide feedback to the user regarding the current selected location in the video clip. According to other implementations, if the user hovers the mouse or cursor 116 over the timeline 112 for a period of time (e.g., two seconds), the preview window 118 may be displayed to provide the user context for the position in the timeline 112 where the user currently hovers the cursor 116.

Different embodiments provide different techniques for moving the playhead 114 across the timeline 112. For example, in certain implementations, the playhead 114 can move across the timeline 112 during a playback of the video clip, or as a result of its manual movement by a user. In some implementations, the playhead 114 manually moves across the timeline 112 in response to a user's selection of the playhead (e.g., through a cursor selection or a touch-screen selection of the playhead) and movement of the selected playhead across the timeline 112. In other implementations, the user does not need to select the playhead, as the playhead 114 manually moves across the timeline 112 as the user moves the cursor 116 or touch-screen contact across the timeline 112. As the playhead 114 moves across the timeline 112, the preview window displays a video frame picture that corresponds to the location of the playhead 114. For example, the media player application associates different locations (e.g., pixels) on the timeline 112 with a video picture (e.g., field or frame) of the corresponding video clip. Thus, as the playhead 114 moves from one location to another location on the timeline 112, different pictures of the video clip represented by the different locations of the playhead 114 are displayed in the preview window 118. When the user manually moves the playhead 114 across the timeline 112, the playhead 114 serves as a scrubbing tool that allows a user to scrub through the content of the video clip. If the user de-selects the playhead 114, (e.g., by releasing the associated mouse cursor used for selection), scrubbing of the video clip ends.

The range that the timeline 112 displays may be referred to as a visible range of the timeline 112. In some implementations, the timeline 112 has a fixed visible range that covers all of the available video and has a granularity that specifies the minimum distance between times discernible in the video playback user interface, dependent on the screen resolution and zoom level of the timeline 112 being displayed. Two frames of the video clip that are closer than the granularity cannot be distinguished between by the user, resulting in a scrubbing tool resolution problem. The granularity may be calculated as the smallest time that can be differentiated by dragging the playhead 114. An example of this is the time represented by one pixel in the presentation of the timeline 112. The user is not able to move the playhead 114 less than one pixel by dragging and dropping. The granularity is in general proportion to the length of the video clip. The timeline 112 during playback of a longer video clip will have coarser granularity, as each one pixel movement of the playhead 114 position along the timeline 112 will traverse more time (and also frames) than a shorter video clip with a similar frame rate. A finer granularity (e.g., less time and/or frames traversed with each one pixel movement of the playhead) would enable a user to more precisely select a desired point in the video clip.

An exemplary timeline may have a pixel width of approximately 600 to 800 pixels. During navigation, the user may re-position the playhead 114 using the cursor 116 on the timeline 112 with a maximum precision of a single pixel width. Media player application timelines generally display the full duration of media clips, which cause navigation fidelity to decrease as the duration of the media clips increase. For example, if a UI representation of the timeline is 600 pixels wide, then 20 seconds of 30 frame-per-second (FPS) video is the most that the user could navigate with frame-level accuracy using typical user input devices (e.g., 30 FPS*20 seconds=600 frames, each associated with a single pixel of the timeline). As the content length of a media clip increases, the mapping of timeline pixel values to frames causes video frames to be skipped, with certain frames becoming inaccessible and un-viewable to the user via mouse or gesture-based navigation. In the given scenario, with a video clip of a one-minute duration, 1,200 frames out of 1,800 total frames (e.g., ~66% of frames) would be skipped during user navigation. For a five minute long clip, 8,400 frames out of 9,000 total frames would be skipped (e.g., ~93% of frames).

Considering that full-length movies often have frame lengths exceeding 200,000 frames, users often have difficulty stepping through frames of video clips with high precision and control. In many applications, accurate control of frames with a granularity of individual frames is not possible, as for example, when moving the playhead 114 along timeline 112. To navigate frames at a greater resolution than the point/pixel-resolution of the width-constrained timeline in video playback UI designs, video frame loupes may be activated to enable frame-by-frame navigation control in a video clip. Video frame loupes zooms in and provides frame-by-frame view of video clips as thumbnail preview frames, displaying hidden frames not previously displayable in the preview window and allow users to navigate with frame level accuracy. Accurate navigation to any point/frame in the timeline will be possible for video clip content of any duration. In such an embodiment, the video frame loupes provide a means to zoom into a frame-by-frame view of the video clip timeline (e.g., each frame is represented in the video frame loupe with a uniform representation regardless of the length of the video clip). This necessitates an ability to scroll through video frame loupes. In other embodiments, the video frame loupe may zoom into arbitrary levels or any user-specified zoom factor (e.g., one-second increments have a uniform representation and are displayed with a representative frame in the video frame loupe regardless of the length of the video clip content).

Figure 2:
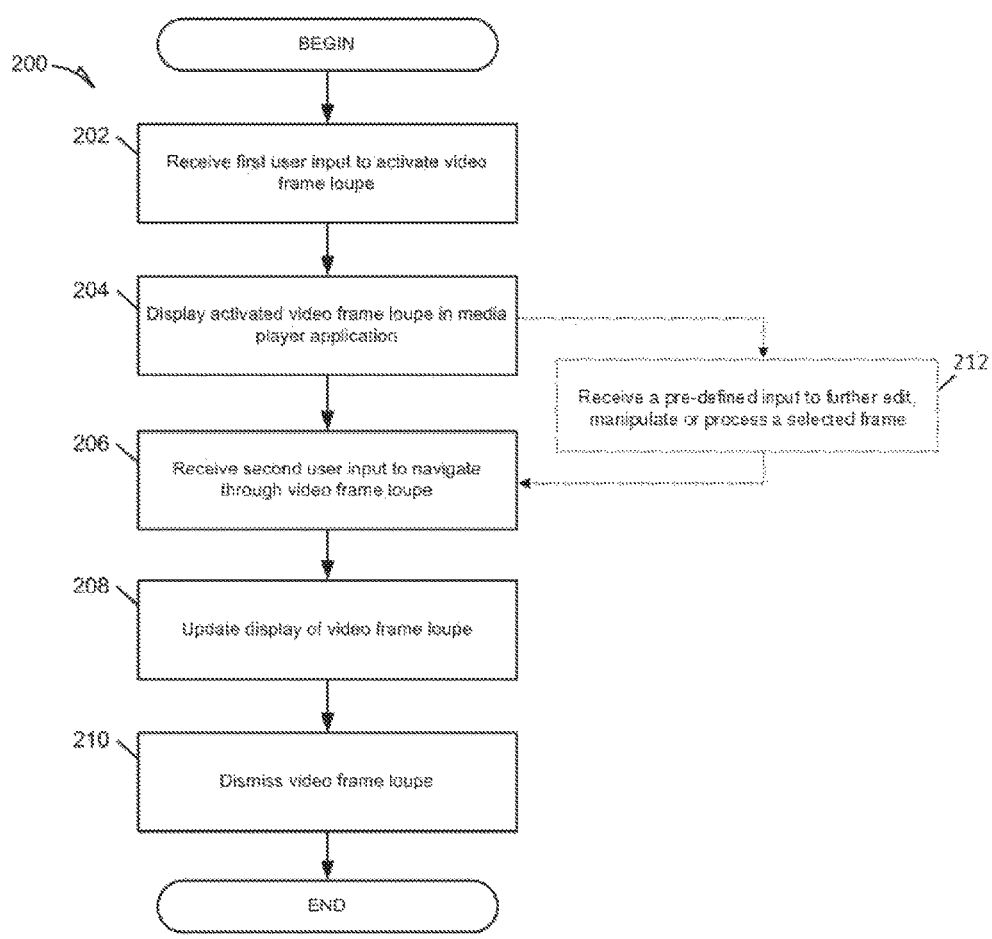
FIG. 2 is a flowchart of illustrating an example method for activating a video frame loupe and navigating frames of a video clip.

The activation and functionalities of video frame loupes discussed herein may be provided by video frame loupe software modules within an application or an operating system executing on a computer system. A user may interact with the computer system using an input device operationally connected to the computer system. A computer system according to an embodiment of the invention shall be discussed in greater detail below with reference to FIG. 6. Although the method operations are described in conjunction with the system of FIG. 6, persons skilled in the art will understand that any system configured to perform the method operations, in any order, is within the scope of the invention FIG. 2 is a flowchart of method operations for activating a video frame loupe and navigating frames of a video clip, according to one embodiment of the present invention. Prior to beginning method 200, a video clip is accessed for playback by a media player application and is displayed. For example, the video clip may be displayed on a video playback user interface (e.g., display environment 100) of a media player application running on a computing device.

As shown, the method 200 begins at operation 202 by receiving a first user input sent by the user through various input mechanisms available to the user (e.g., the user may send the first user input by pressing a button on a keyboard or pressing a mouse button). The video playback user interface may display a user interface element (not shown) for activating a video frame loupe of the media player application. For example, in certain implementations, a user may activate the video frame loupe of the media player application by selecting a menu item from a pull-down menu, or by selecting a user interface element displayed in display environment 100 or displayed on control element 104. Alternatively, the video frame loupe may be activated by providing a cursor input (e.g., by mouse click, keyboard input, touch of a touch pad or touch screen, or any combination thereof) indicating that the user would like to activate the video frame loupe. If the video clip is currently being played, video playback may be paused while the video frame loupe is activated.

In operation 204, the activated video frame loupe is displayed in the media player application. With additional reference to FIG. 3, an example display environment 300 is illustrated that shows a video frame loupe according to one embodiment. The activated video frame loupe 302 displays multiple sequential frames of the video clip. Frames of the video clip appear separately and horizontally across the video frame loupe. The video frame loupe may be presented to a user to provide a contextual preview of video frames located around a time associated with a position along the timeline 304. Video frames adjacent to the position in the timeline 304 are determined. For example, the video frame loupe 302 includes three video frames, 306, 308, and 310 that surround a particular position (e.g., position at which the video frame loupe was activated) in the video clip. Frames 306, 308, 310 are displayed in the video frame loupe 302 as a contiguous sequence of video frames. Frames 306, 308, and 310 display Pictures B, C, and D, respectively, and are positioned in the video frame loupe 302 in the same relative order as they would be presented during video clip playback. This means that, for example, Picture D will be played in the display environment 300 after Picture C during playback of the video clip.

In this example, the video frame loupe 302 appears as a bounded user interface element that presents a continuum of frames at the time corresponding to the point (e.g., pixel value on the timeline) at which the video frame loupe 302 was activated (the "activation point"). As shown, the video frame loupe 302 is displayed as being centered above the playhead 312. Other embodiments may display the video frame loupe 302 in different locations, for example, centered in the middle of the timeline 304, displayed as replacing the timeline 304, or overlaid on top of any other portion of the display environment 300. In this example, the video frame loupe 302 pops up as a frame-by-frame level navigation tool centered above the current position of the playhead 312. The video frame loupe 302 expands and is displayed around a location above the timeline 304. This location corresponds to frame 308 of the video clip. Frame 308 may be visually distinguished, for example, with a bolded outline to indicate frame 308 as being the activation point. Frames 306 and 310 are adjacent video frames that correspond to video frames positioned immediately before and after frame 308 within the video clip, respectively.

In some implementations, there can be one adjacent video frame. For example, if the position at which the video frame loupe 302 was activated is at the beginning or end of the video clip, then there may be only one video frame adjacent to the activation point. When the video frame loupe 302 is activated at the beginning of the video clip, the video frame loupe 302 may be displayed as being left-aligned above the playhead 312. Additionally, a first frame on the left side of the video frame loupe 302 may be visually distinguished (e.g., bolded outline) to indicate to the user that the video frame loupe 302 is at the first frame of the video clip and that navigation to an earlier point in time is not possible. When the video frame loupe 302 is activated at the end of the video clip, the video frame loupe 302 may be displayed as being right-aligned above the playhead 312. Additionally, a last frame on the right side of the video frame loupe 302 may be visually distinguished (e.g., bolded outline) to indicate to the user that the video frame loupe 302 is at the last frame of the video clip and that navigation to a later point in time is not possible. In this example, the user has activated the video frame loupe 302 in the middle of the video clip and is therefore centered above the playhead 312. Frames 306, 308, and 310 are displayed within the video frame loupe 302, with frame 308 (e.g., the middle frame) is visually distinguished (e.g., bolded outline) to indicate to the user that navigation forwards or backwards in time is possible.

In certain implementations, the video frame loupe 302 may be repositioned and moved about the display using cursor 314. For example, a user may move cursor 314 around the display and the video frame loupe 302 may move proximate to cursor 314 such that cursor 314 and the video frame loupe 302 appear to move together.

Once triggered by a user action (input), the video frame loupe 302 appears with frames that can be individually distinguished, thereby permitting selection by the user of any one particular frame. As previously discussed, a width-constrained user interface only allows a limited number of pixels, and therefore the number of frames in the video frame loupe, to be displayed within display environment 300. In operation 206, a second user input is received that allows the user to navigate continuously forward or backward through the video frame loupe to an exact frame desired. Subsequently, the video frame loupe may be dismissed by a user action once the desired frame has been displayed.

Various mouse-based navigation elements may be provided to navigate the video frame loupe 302. For example, in response to user movement signals from a mouse, the cursor 314 floats (e.g., moves freely) across the display environment 300 to a desired location. A video frame in the video frame loupe 302 may be selected using a user generated signal (e.g. mouse button "cursor clicks" and "drags") to specify a new frame in the video frame loupe to be navigated to. During or after cursor movement, the user may use a cursor click for selecting and manipulating on-screen objects, elements and controls, in a manner as is well known in the art. In one embodiment, navigation elements 316 and 318 are provided that may be selected using the cursor 314 to scroll the video frame loupe 302 to the left and right, respectively. Similarly, sliders may also be used to scroll the video frame loupe 302 to see hidden frames. These types of horizontal navigation elements allow the user to view sequential frames in the video frame 302 that are not viewable using a preview window of the timeline during scrubbing. In another embodiment, while the video frame loupe 302 is activated, the user may move the mouse cursor 314 vertically away from the timeline 304 and then move the cursor horizontally to navigate through the frames of the video frame loupe 302. Alternatively, the user may use a mouse scroll button to navigate through the frames of the video frame loupe 302 or position cursor 314 over a frame and provide a mouse click input indicating that the user would like to select the frame.

Further, various keyboard inputs can also be provided to facilitate navigation of the video frame loupe, such as described further below. For example, to indicate selection of a frame, the user may press and hold a key (e.g., command key, shift key, control key, etc.) on a keyboard. Alternatively, pressing left and right arrows on the keyboard allows navigation through the frames of the video frame loupe 302.

Gesture-based navigation may be provided if the display environment 300 is provided on a touch screen, track pad, or within any operating system that supports gesture-type inputs from user input devices. An example gesture involves a substantially horizontal swiping motion over the video frame loupe 302. The horizontal direction is defined with respect to the horizontal axis of the video clip (e.g., when the video clip is viewed the right way up, the horizontal axis is oriented in the left-right direction along the timeline). In various embodiments, a single finger horizontal swipe causes the video to skip a single frame forward or back, with a right-to-left direction of movement causing the immediately succeeding frame in the video frame loupe 302 being selected, and a left-to-right direction of movement causing the immediately preceding video frame in the video frame loupe 302 being selected.

In other embodiments, rather than frame-by-frame navigation, the user may also advance or go back more than one frame if the horizontal swipe is performed with more than one finger. For example, with two fingers, the video frame loupe 302 may advance or go back a predetermined number of frames (e.g., five or more frames when the video frame loupe detects a multi-finger swipe from right to left or left to right, respectively). The predetermined number may be selected by the user, or may be preset to a default number. The number of frames skipped is based, at least in part, on the number of fingers detected in the swipe gesture. For example, two fingers may cause the application to skip a first predetermined number of frames, three fingers a second predetermined number of frames, and so on up to five fingers. Each of the predetermined number of frames may be user-selectable or preset, and may be the same as each other or different. This feature increase the number of frames skipped with each additional finger detected.

Figure 4:
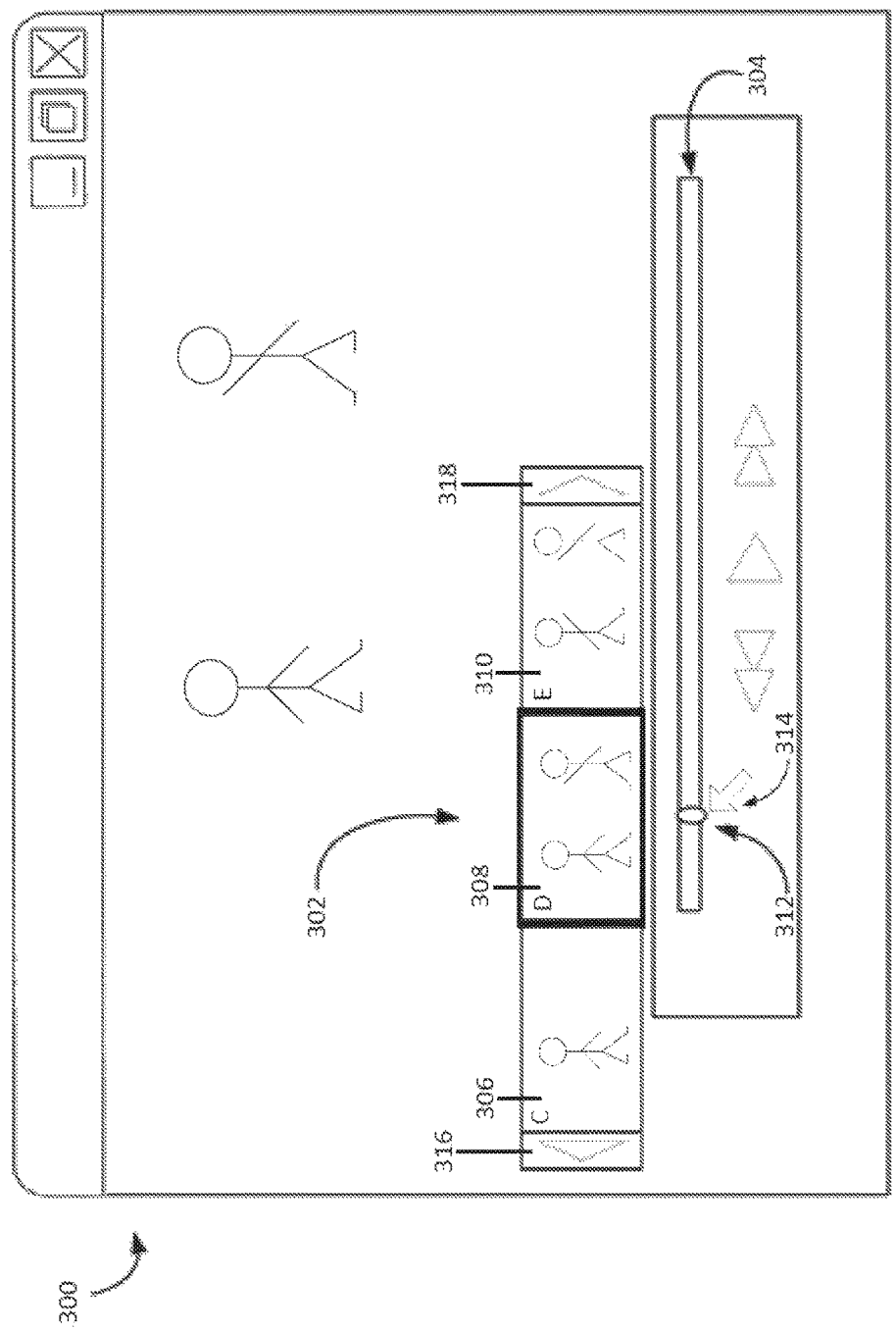
FIG. 4 depicts an illustration of a display screen showing a video frame loupe according to another example embodiment.

In operation 208, after the media player application has received the navigation input and responded accordingly, the video frame loupe 302 provide the user with feedback indicating that the requested action has been taken. For example, the appearance of a selected frame can be changed to indicate its selection status. When the video frame loupe 302 is initially displayed after being activated, frame 308 of the video frame loupe 302 is displayed as including a selection frame by default. The selection frame is an indicator (e.g., a bolded frame outline in this example) that indicates that a particular frame is presently selected. As the video frame loupe 302 is navigated, frames are scrolled through the selection frame in two possible directions (e.g., left-to-right or right-to-left). FIG. 4 illustrates the result of user input to scroll through the video frame loupe 302 to the left to select Picture D, thereby bringing Picture E into the video frame loupe 302 from the right and moving Picture B out of the display to the left. In FIG. 4, Frames 306, 308, and 310 now display Pictures C, D, and E, respectively, and remain positioned in the video frame loupe 302 in the same relative order as they would be presented during video clip playback. This means that, for example, Picture D will be played in the display environment 300 after Picture C, and that Picture E will be played in the display environment 300 after Picture D during playback of the video clip. Frame 308 of the video frame loupe 302 remains displayed as including the selection frame, but not displays Picture D. In certain implementations, as the user navigates through the video frame loupe 302, the picture previewed in the selection frame is also displayed on display environment 300. One of ordinary skill in the art will recognize that although the examples discussed herein describe horizontal navigation by scrolling right and left, some embodiments may have the video frame loupe arranged vertically with a primary scrolling direction of up and down or may scroll diagonally, etc.

Figure 3:
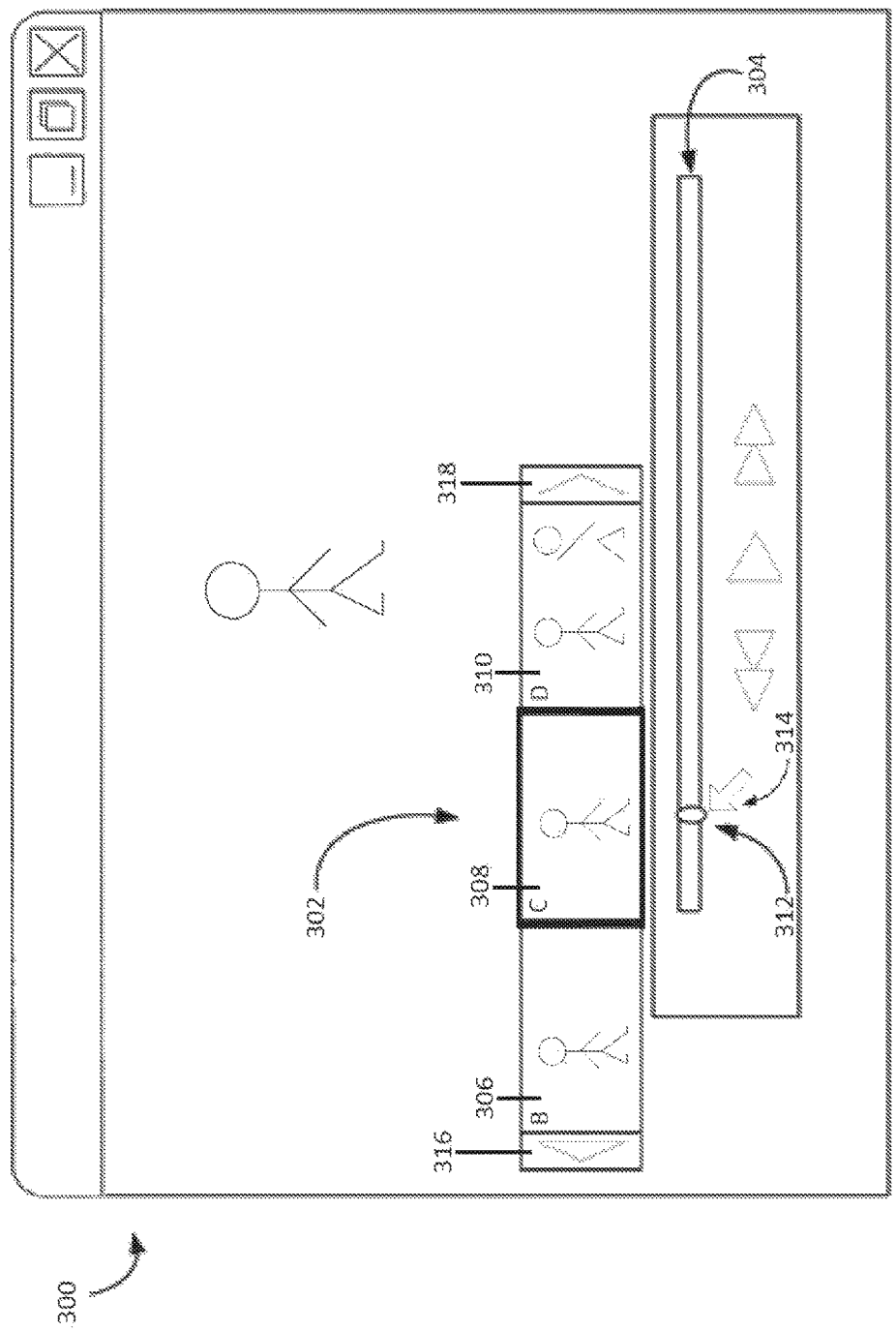
FIG. 3 depicts an illustration of a display screen showing a video frame loupe according to an example embodiment.

While the examples in FIGS. 3 and 4 display a single frame on either side of the selection frame in the video frame loupe 302, other embodiments may display any number of frames on either side of the selection frame. In certain embodiments, those frames that are not in the selection frame may be displayed as partially faded. For instance, in FIG. 3, such an embodiment might display Picture B in frame 306 to the left (and also Picture D in frame 310 to the right) of the selection frame (i.e., frame 308), but displays these pictures as partially transparent to indicate that they are adjacent picture frames but are not currently in the selection window. Similarly, in FIG. 4, such an embodiment might display Picture C in frame 306 to the left (and also Picture E in frame 310 to the right) of the selection frame, but displays these pictures as partially transparent to indicate that they are adjacent picture frames but are not currently in the selection window.

In another embodiment, the adjacent frames that are not in the selection frame may be presented in holding areas positioned to the left and to the right of the selection frame in the video frame loupe. The holding areas may include any number of frames, which are arranged in an overlapping and/or tilted manner to allow for space-efficient display of multiple frames next to the selection frame. Thus, the video frame loupe 302 is not limited to the number of frames that may be displayed for preview. The overlapping frames to the left and right of the selection frame represent additional frames that can be presented to the user via frame-by-frame navigation for selection. In response to user input, using for example, on-screen scrollbars, mouse wheel, or gestures, the previously non-selectable frames displayed in the holding areas moves into the selection frame, which is displayed in a flat, non-overlapping manner, and becomes user-selectable.

Next, method 200 determines at operation 210, whether any input has been received to dismiss the video frame loupe 302. Similar to the activation of the video frame loupe, an input instructing the video frame loupe 302 to be dismissed may be received through a cursor controller such as a mouse, track pad, touchpad, etc. (e.g., dragging, scrubbing, clicking, etc.) or through a keyboard (e.g., pressing arrow keys, the Enter key, etc.).

The method 200 may further include an optional operation 212, as indicated by the dashed lines, wherein a pre-defined input can cause the system to further edit, manipulate, or process a selected frame (e.g., a video frame currently displayed within the selection frame) by selecting or manipulating the selected frame (or multiple frames around the selected frame). For example, in certain implementations, receiving the pre-defined user input causes the system to set the playhead to the selected frame. In another example, receiving the pre-defined user input causes the system to select a pre-defined number of frames around the selected frame for editing in a multimedia editing application (e.g., photo, audio, or video editors).

In certain implementations, where a button (e.g., keyboard or mouse) is held to activate the video frame loupe 302, the video frame loupe 302 may remain displayed until the held button is released. While the user continues to hold the mouse button down, the video frame loupe 302 continues to be displayed at the location of the cursor. If the user releases the mouse button at a location other than the timeline or if the user dismisses the video frame loupe 302 by pressing a keyboard key (e.g., Esc or Backspace keys), the video frame loupe 302 is removed from display, causing the display environment 300 to return to the user interface as illustrated in FIG. 1. For example, when a dismiss input is received (e.g., the video frame loupe is canceled or released) an animation may be performed in which the frames in the video frame loupe 302 may be shown or animated to disappear into the playhead on the timeline. In certain implementations, a gesture that is substantially aligned with the vertical axis of the currently displayed horizontal timeline is used to dismiss the video frame loupe. For example, in embodiments capable of receiving gesture input, a finger swipe down over the video frame loupe is interpreted as an instruction to dismiss.

Figure 5:
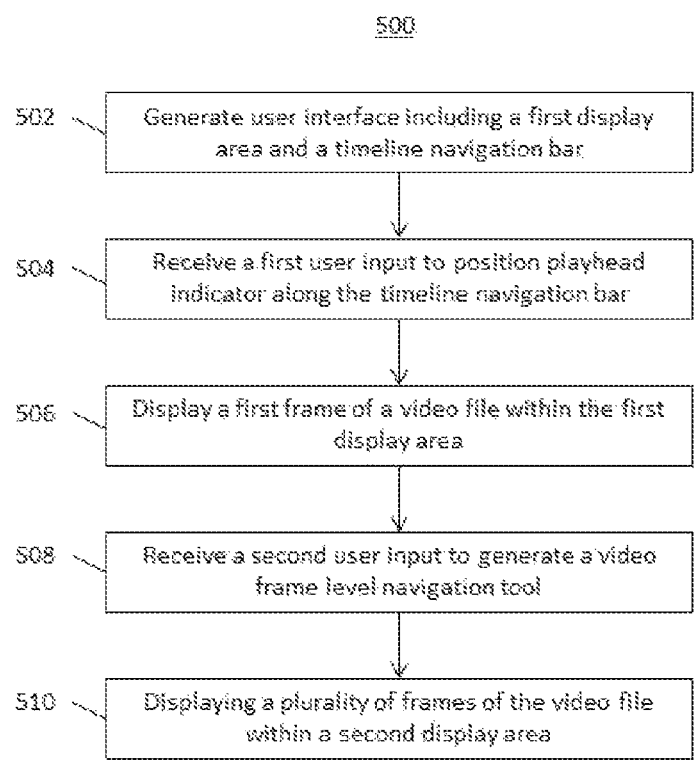
FIG. 5 is a flowchart which depicts an example of an example method for providing a video frame level navigation tool.

FIG. 5 is a flowchart which depicts an example of a method 500 according to one embodiment in which a video frame level navigation tool (e.g., video frame loupe) is provided. The operation can begin at operation 502 during which a user interface is generated that includes a first display area to display output of a video file and a timeline navigation bar. The timeline navigation bar may include a playhead indicator positionable along the timeline navigation bar to positions associated with a first set of temporal locations within the video file. In this example, the first set of temporal locations within the video file represent time segments having a first granularity coarser than a single frame of the video file. The method 500 continues at operation 504 by receiving a first user input that positions the playhead indicator along the timeline. At operation 506, a first frame of the video file corresponding to the temporal location represented by a current position of the playhead is displayed within the first display area. At operation 508, a second user input is received, which is used to generate a video frame level navigation tool for display within the user interface. The video frame level navigation tool includes a second display area to display a plurality of frames of the video file and a selection frame display to indicate a frame level temporal position within the video file. At step 510, a plurality of frames of the video file is displayed with a second granularity between each of the plurality of frames that is finer than the first granularity. The plurality of frames includes the first frame and at least one additional frame adjacent to the first frame, wherein the first frame is displayed within the selection frame display. In certain implementations, the second granularity may comprise frame level accuracy.

One of ordinary skill in the art would understand that while the above methods for navigation are described only in the context of video frame navigation using video frame loupes, the methods may also be applied to navigation of audio clips. In such an embodiment, an audio loupe may allow a listener to navigate audio samples more accurately.

Though arranged serially in the example of FIGS. 2 and 5, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Example Machine Architecture and Machine-Readable Medium

Figure 6:
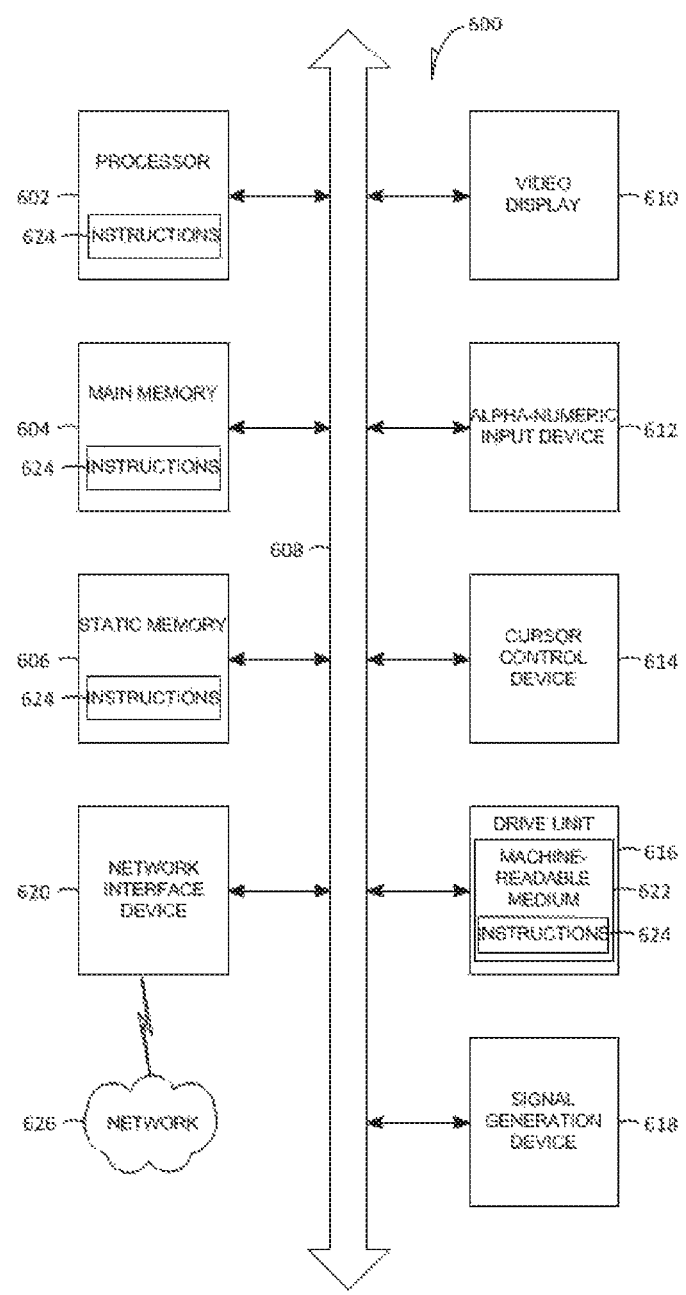
FIG. 6 is a diagrammatic representation of a machine in the example form of a computer system within which a set of instructions for causing the machine to perform any one or more of the methodologies discussed herein may be executed.

The video frame loupes described herein may be implemented by video frame loupe software, which may be comprised within an application or an operating system executing on a computer system. FIG. 6 is a block diagram of a machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or used by any one or more of the methodologies or functions described herein. The instructions 624 may also reside, completely or at least partially, within the main memory 604, static memory 606, and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing or encoding data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. All such machine readable storage media are hardware devices suitable for storing data and/or instructions for a suitable period of time to enable use by the machine, and are therefore non-transitory.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for providing a video frame level navigation tool, the method comprising:
   generating a user interface including a first display area to display, on a display device, output of a video file and a timeline navigation bar, the timeline navigation bar including a playhead indicator positionable along the timeline navigation bar to positions associated with a first set of temporal locations within the video file, the first set of temporal locations within the video file representing time segments having a first granularity coarser than a single frame of the video file, wherein the first granularity is limited by a number of pixels of the display device that are allocated to the timeline navigation bar;
   receiving a first user input positioning the playhead indicator at a current position along the timeline navigation bar, wherein the current position corresponds to, within the video file based on the first granularity, a first frame and at least one additional frame adjacent to the first frame;
   displaying, within the first display area and in response to the first user input, the first frame of the video file, wherein the at least one additional frame adjacent to the first frame is not displayable within the first display area due to limitation of the first granularity;
   generating, in response to a second user input, the video frame level navigation tool for display within the user interface, the video frame level navigation tool including a second display area having a selection frame display to indicate a frame level temporal position within the video file; and
   displaying, within the second display area, a plurality of frames of the video file having a second granularity between each of the plurality of frames that is finer than the first granularity, the plurality of frames including a sequence of contiguous frames including the first frame and the at least one additional frame adjacent to the first frame, wherein the first frame is displayed within the selection frame display, wherein the video frame level navigation tool displayed in the second display area includes one or more navigation elements for scrolling within the video file, at the second granularity, through the plurality of frames to display the sequence of contiguous frames during scrubbing.

2. The method of claim 1, wherein the video frame level navigation tool includes at least one navigation element for scrolling through, at the second granularity, the plurality of frames displayed within the second display area.

3. The method of claim 1, further comprising:
   indexing, in response to a third user input, of a second frame into the selection frame display, the second frame included in the plurality of frames displayed in the second display area.

4. The method of claim 3, wherein the second frame displayed within the selection frame display is presented as a thumbnail preview frame.

5. The method of claim 4, further comprising:
   updating a picture displayed within the first display area in response to the third user input, wherein the picture is a full size version of the thumbnail preview frame.

6. The method of claim 1, wherein the video frame level navigation tool is displayed as a bounded user interface element offset from the timeline navigation bar.

7. The method of claim 1, further comprising:
   detecting a fourth user input to remove the video frame level navigation tool from display.

8. The method of claim 1, further comprising:
   receiving a reposition input to move the display of the video frame level navigation tool.

9. The method of claim 1, wherein the plurality of frames displayed within the second display area represent sequential frames of the video file.

10. A non-transitory computer-readable medium storing instructions for execution by the one or more processors, the instructions when executed by the one or more processors cause the one or more processors to perform operations including:
   generating a user interface including a first display area to display, on a display device, output of a video file and a timeline navigation bar, the timeline navigation bar including a playhead indicator positionable along the timeline navigation bar to positions associated with a first set of temporal locations within the video file, the first set of temporal locations within the video file representing time segments having a first granularity coarser than a single frame of the video file, wherein the first granularity is limited by a number of pixels of the display device that are allocated to the timeline navigation bar;
   receiving a first user input positioning the playhead indicator at a current position along the timeline navigation bar, wherein the current position corresponds to, within the video file based on the first granularity, a first frame and at least one additional frame adjacent to the first frame;
   displaying, within the first display area and in response to the first user input, the first frame of the video file, wherein the at least one additional frame adjacent to the first frame is not displayable within the first display area due to limitation of the first granularity;
   generating, in response to a second user input, the video frame level navigation tool for display within the user interface, the video frame level navigation tool including a second display area having a selection frame display to indicate a frame level temporal position within the video file; and
   displaying, within the second display area, a plurality of frames of the video file having a second granularity between each of the plurality of frames that is finer than the first granularity, the plurality of frames including a sequence of contiguous frames including the first frame and the at least one additional frame adjacent to the first frame, wherein the first frame is displayed within the selection frame display, wherein the video frame level navigation tool displayed in the second display area includes one or more navigation elements for scrolling within the video file, at the second granularity, through the plurality of frames to display the sequence of contiguous frames during scrubbing.

11. The non-transitory computer-readable medium of claim 10, further comprising instructions that cause indexing, in response to a third user input, of a second frame into the selection frame display, the second frame included in the plurality of frames displayed in the second display area.

12. The non-transitory computer-readable medium of claim 11, wherein the instructions that cause indexing of the second frame into the selection frame display further comprise instructions that cause the second frame to be displayed within the selection frame display as a thumbnail preview frame.

13. The non-transitory computer-readable medium of claim 10, wherein the instructions that cause generating the video frame level navigation tool further comprise instructions that cause displaying the video frame level navigation tool as a bounded user interface element offset from the timeline navigation bar.

14. The non-transitory computer-readable medium of claim 10, wherein the instructions that cause displaying, within the second display area, the plurality of frames comprise instructions that cause frame-by-frame displaying of sequential frames of the video file.

15. The non-transitory computer-readable medium of claim 10, wherein the instructions that cause generating the video frame level navigation tool further comprise instructions that cause the display of at least one navigation element for scrolling through, at the second granularity, the plurality of frames displayed within the second display area.

16. A system comprising:
   at least one processor; and
   a computer-readable medium storing one or more sequences of instructions which, when executed by the at least one processor, causes:
   generating a user interface including a first display area to display, on a display device, output of a video file and a timeline navigation bar, the timeline navigation bar including a playhead indicator positionable along the timeline navigation bar to positions associated with a first set of temporal locations within the video file, the first set of temporal locations within the video file representing time segments having a first granularity coarser than a single frame of the video file, wherein the first granularity is limited by a number of pixels of the display device that are allocated to the timeline navigation bar;
   receiving a first user input positioning the playhead indicator at a current position along the timeline navigation bar, wherein the current position corresponds to, within the video file based on the first granularity, a first frame and at least one additional frame adjacent to the first frame;
   displaying, within the first display area and in response to the first user input, the first frame of the video file, wherein the at least one additional frame adjacent to the first frame is not displayable within the first display area due to limitation of the first granularity;
   generating, in response to a second user input, the video frame level navigation tool for display within the user interface, the video frame level navigation tool including a second display area having a selection frame display to indicate a frame level temporal position within the video file; and
   displaying, within the second display area, a plurality of frames of the video file having a second granularity between each of the plurality of frames that is finer than the first granularity, the plurality of frames including a sequence of contiguous frames including the first frame and the at least one additional frame adjacent to the first frame, wherein the first frame is displayed within the selection frame display, wherein the video frame level navigation tool displayed in the second display area includes one or more navigation elements for scrolling within the video file, at the second granularity, through the plurality of frames to display the sequence of contiguous frames during scrubbing.

17. The system of claim 16, further comprising instructions that cause indexing, in response to a third user input, of a second frame into the selection frame display, the second frame included in the plurality of frames displayed in the second display area.

18. The system of claim 16, wherein the instructions that cause generating the video frame level navigation tool further comprise instructions that cause displaying the video frame level navigation tool as a bounded user interface element offset from the timeline navigation bar.

19. The system of claim 16, wherein the instructions that cause displaying, within the second display area, the plurality of frames comprise instructions that cause frame-by-frame displaying of sequential frames of the video file.

20. The system of claim 16, wherein the instructions that cause generating the video frame level navigation tool further comprise instructions that cause the display of at least one navigation element for scrolling through, at the second granularity, the plurality of frames displayed within the second display area.

* * * * *